United States Patent [19]
Schutz

[11] Patent Number: 5,678,688
[45] Date of Patent: Oct. 21, 1997

[54] PALLET CONTAINER

[75] Inventor: Udo Schutz, Selters, Germany

[73] Assignee: Protechna S.A., Fribourg, Switzerland

[21] Appl. No.: 621,933

[22] Filed: Mar. 26, 1996

[30] Foreign Application Priority Data

Mar. 30, 1995 [DE] Germany .................. 195 11 723.9

[51] Int. Cl.[6] ................................. B65D 19/00
[52] U.S. Cl. ................ 206/386; 206/600; 220/1.5; 220/401
[58] Field of Search ................. 206/386, 600; 220/1.5, 9.1, 9.2, 9.3, 401

[56] References Cited

U.S. PATENT DOCUMENTS

| | | | |
|---|---|---|---|
| 4,157,609 | 6/1979 | Schutz | 220/1.5 |
| 4,909,387 | 3/1990 | Schutz | 206/386 |
| 4,947,988 | 8/1990 | Schutz | 206/386 |
| 5,133,476 | 7/1992 | Schutz | 220/1.5 |
| 5,366,090 | 11/1994 | Schutz | 206/600 |
| 5,405,006 | 4/1995 | Burgdorf et al. | 206/386 |

FOREIGN PATENT DOCUMENTS

| | | |
|---|---|---|
| 38 44 605 | 5/1992 | Germany . |
| 38 19 911 | 7/1992 | Germany . |
| 38 29 647 | 10/1992 | Germany . |

*Primary Examiner*—Paul T. Sewell
*Assistant Examiner*—Luan K. Bui
*Attorney, Agent, or Firm*—Young & Thompson

[57] ABSTRACT

The pallet container has a plastic inner container and a lattice jacket of vertical and horizontal lattice rods (9, 10) of metal. Stacking and transport safety is achieved by special design of the intersections (15) where the lattice rods (9, 10) are welded to one another. At these intersections (15) lattice rods (9, 10) are indented to form double-walled, cavity-like depressions (16). The depressions (16) have a center elevation (17). At each intersection (15) between longitudinal edges (18, 19) of center elevations (17) of depressions (16) of two lattice rods (9, 10) which lie at right angles on top of one another, this shaping of the lattice rods (9, 10) results in the formation of four contact points (20) which lie in one plane, each with a material accumulation which corresponds to four times the wall thickness of the lattice rods. The lattice rods (9, 10) are joined to one another by electrical resistance pressure welding or electrical spot welding at intersections (15) in the area of four contact points (20). The sections (25, 26) of cavity-like depression (16) of the lattice rods (9, 10), the sections adjacent on each side to elevation (17) with contact and welding points (20), form bending points of limited elasticity with a bending resistance moment which is reduced relative to the elevation (17) to relieve the welds at the intersections (15) under static and/or dynamic loading of the lattice jacket.

4 Claims, 3 Drawing Sheets

5,678,688

PALLET CONTAINER

BACKGROUND OF THE INVENTION

The invention relates to pallet containers for transport and storage of liquids, with a flat pallet, an interchangeable inner container of plastic with upper, sealable fill opening and lower drain means as well as an outer jacket which surrounds the inner container and which consists of vertical and horizontal lattice bars of metal, which support the liquid-filled plastic inner container, the lattice rods which are made as pipes being indented at the intersections for formation of cavity-shaped, double-walled depressions which run in the longitudinal direction of the lattice rods such that at each intersection between the longitudinal edges of the depressions of two lattice rods which lie at right angles on top of one another four contact points are formed with one material accumulation each which corresponds to four times the thickness of the lattice rod wall, and the four contact points of the two lattice rods are welded to one another at the intersections.

The weld connections at the intersections of the vertical and horizontal lattice rods of the lattice jacket of pallet containers of this type known from DE 38 39 647 C2 are exposed to static bending stresses as a result of stacking loads when several containers are stacked and pulsating bending stresses during transport caused by surge vibrations which originate from the liquid in the plastic inner container and which are transmitted via the flexible jacket of the inner container to the lattice jacket, and driving vibrations transferred through the transport vehicle, and to impact and shock stress, for example, when the pallet container falls from a height. These stresses can lead to fracture of the welds at the intersections of the lattice rods of the lattice jacket so that the required stacking and transport safety of the pallet container is no longer ensured.

OBJECT OF THE INVENTION

The object of the invention is to increase the durability of the welds at the intersections of the vertical and horizontal lattice rods of the lattice jacket of the generic pallet container by relieving static and dynamic loads in operation and thus to improve the stacking and transport safety of the container.

By means of the shaping of the horizontal and vertical lattice rods according to the invention at their intersections in a pallet container with a lattice jacket and plastic inner container which forms bending points of limited elasticity in the area of the welds of the lattice rods at the intersections, during transport the welds are for the most part relieved of the static bending stresses and dynamic bending stresses which occur during stacking so that a major improvement of the durability of the welds of the lattice rods of the lattice jacket and thus increased operating safety of the pallet container compared to the known containers is achieved.

BRIEF DESCRIPTION OF THE DRAWINGS

The invention is detailed below using drawings.

DETAILED DESCRIPTION OF THE INVENTION

Figure 1:
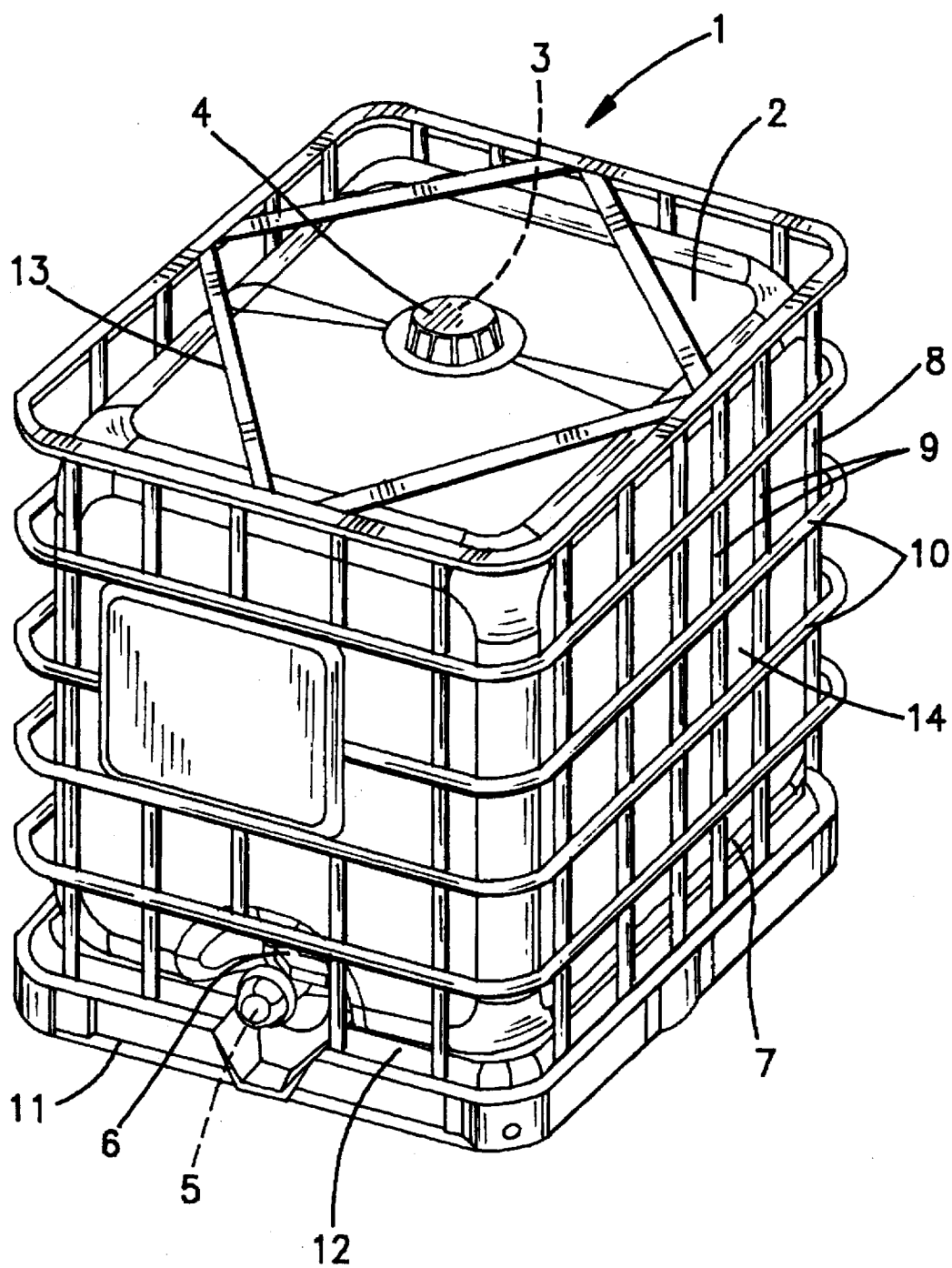
FIG. 1 shows a perspective view of a pallet container with lattice jacket.

Pallet container 1 used as a retainable and non-retainable container according to FIG. 1 for transport and storage of liquids as main components has interchangeable cuboidal inner-container 2 of polyethylene with rounded corners, which is equipped with filler neck 3 which can be closed with screw cover 4 and drain nozzle 5 with bleeder cock 6 as well as drain bottom 7, outer jacket 8 of intersecting vertical and horizontal lattice rods 9, 10 of metal, sheet metal pallet 11 made as flat bottom tray 12 with Eurostandard length and width dimensions for form-fit accommodation of plastic inner container 2, and upper frame 13 of diagonally arranged pipe braces for stiffening of lattice jacket 8 and for protection of inner container 2.

Vertical and horizontal lattice rods 9, 10 support outer wall 14 of liquid-filled inner container 2 and form continuous outer and inner boundary planes so that "climbing" of pallet containers 1 standing next to one another due to distortion of the stowage surface during transport of the containers, for example, with a truck, is precluded.

Figure 3:
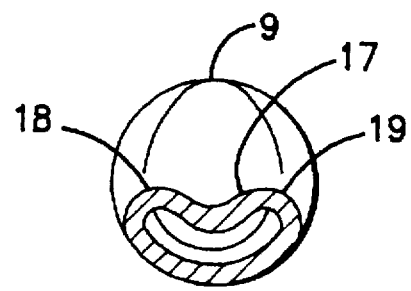
FIG. 3 shows a cross section of the lattice rod according to line III—III of FIG. 2.
Figure 2:
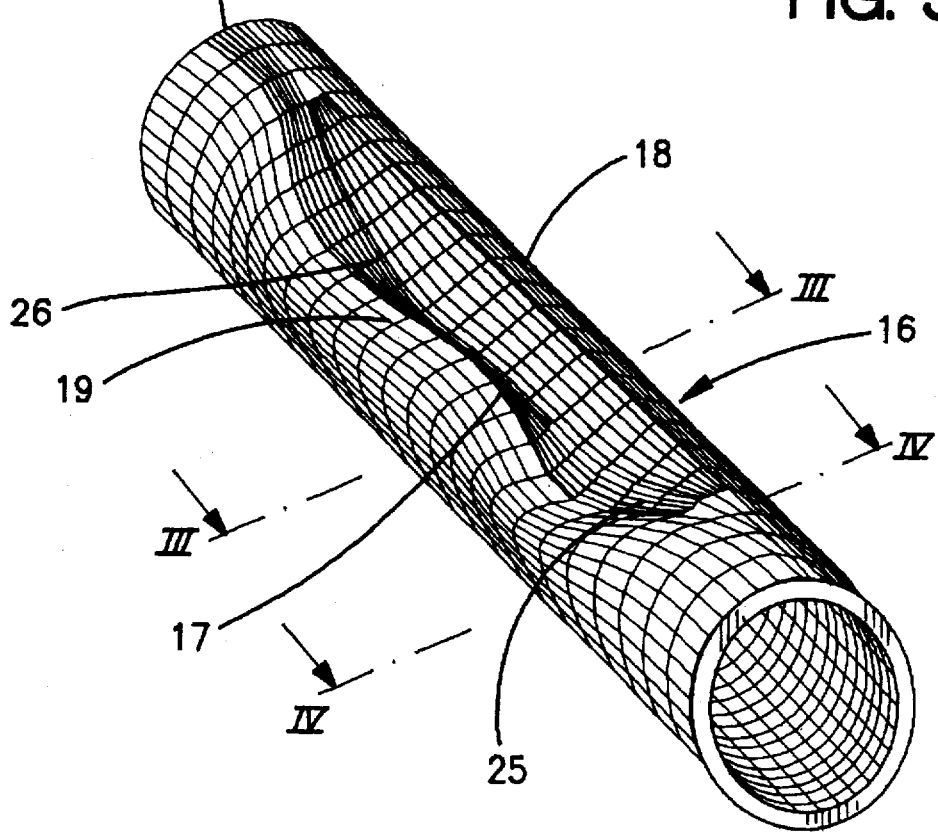
FIG. 2 shows a perspective view of a lattice rod in the area of an intersection.
Figure 4:
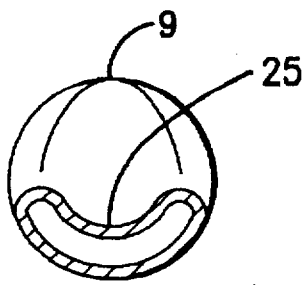
FIG. 4 shows a cross section of the lattice rod according to line IV—IV of FIG. 2.
Figure 5:
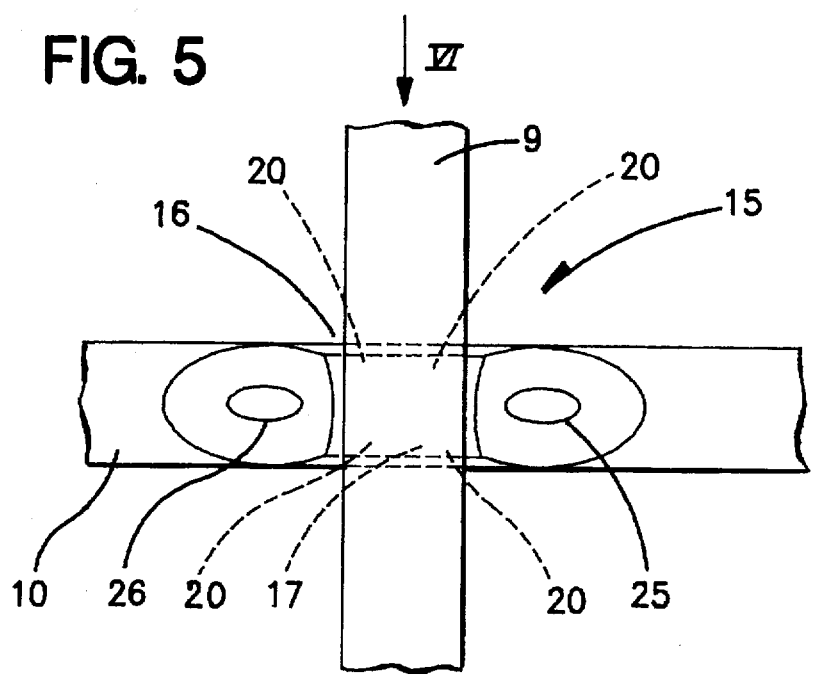
FIG. 5 shows an overhead view of an intersection of two lattice rods before resistance pressure welding of the rods.
Figure 6:
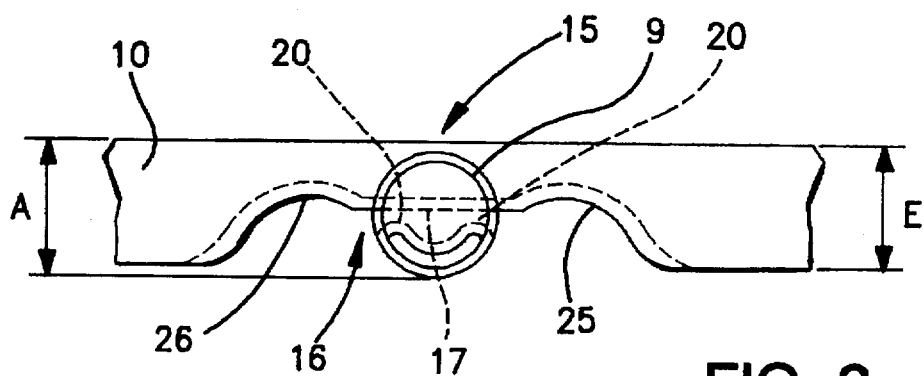
FIG. 6 shows one view of the intersection of two lattice rods in the direction of arrow VI of FIG. 5
Figure 7:
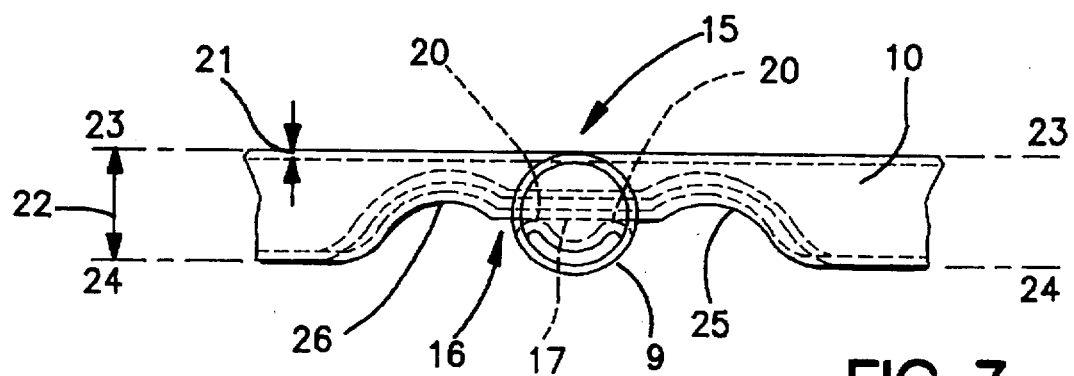
FIG. 7 shows one view of an intersection which corresponds to the view according to FIG. 6 after the rods are welded.

At intersections 15 vertical and horizontal lattice rods 9, 10 are indented to form double-walled, cavity-like depressions 16 which run in the longitudinal direction of the rods and which have a kidney-like cross sectional shape. Cavity-like depressions 16 have center elevation 17 (FIGS. 2–4). At each intersection 15 between longitudinal edges 18, 19 of center elevations 17 of cavity-shaped depressions 16 of two lattice rods 9, 10 which lie at right angles on top of one another, this shaping of lattice rods 9, 10 results in formation Of four contact points 20 which lie in one plane, each with a material accumulation which corresponds to four times the wall thickness 21 of the lattice rods (FIGS. 5–7). Center elevations 17 of depressions 16 which are indented into lattice rods 9, 10 are dimensioned such that initial measure A which is measured in the direction of the normal through intersections 15 before welding of joined lattice rods 9, 10 is greater than one outside diameter 22 of the lattice rod (FIG. 6). Lattice rods 9, 10 are joined to one another at intersections 15 each in the area of four contacts points 20 by electrical resistance pressure welding such that initial measure A is reduced under pressure to final measure E which corresponds to one outside diameter 22 of the lattice rod and lattice rods 9, 10 have common tangential planes 23—23 and 24—24 inside and outside (FIG. 7).

The accumulation of material of four times the thickness 21 of the lattice rod wall at each of four contact points 20 at all intersections 15 of vertical and horizontal lattice rods 9, 10 of outer jacket 8 results in that for corresponding control of the welding current and pressure of the welding press a current flows via contact points 20 which produces uniform melt pools which are limited to the contact points and which ensure homogenous welds at intersections 15 between lattice rods 9, 10.

Sections 25, 26 of cavity-like depression 16 of lattice rods 9, 10, the sections adjacent on each side to elevation 17 with four contact and welding points 20, form bending points of limited elasticity with a bending resistance moment which is reduced relative to elevation 17 to relieve the welds at intersections 15 of vertical and horizontal lattice rods 9, 10 under static or dynamic loading of lattice jacket 8.

In possible electrical spot welding of lattice rods 9, 10 at intersections 15 the thickness measurement of intersections 15 which is measured perpendicularly to the plane of lattice jacket 8 corresponds roughly to measure A which is shown in FIG. 6 and which is somewhat greater than outside diameter 22 of lattice rods 9, 10 so that the inner and outer boundary planes of vertical and horizontal lattice rods 9, 10 are offset slightly parallel to the inside and outside. However this has no adverse effect on preventing the "climbing effect" of pallet containers standing next to one another during transport which was mentioned in the introductory part of the description.

I claim:

1. A pallet container for transport and storage of liquids in an inner container, the pallet container comprising an outer jacket surrounding an inner container, said outer jacket comprising vertical and horizontal lattice rods of metal supporting the inner container, the lattice rods being indented at intersections thereof to form cavity-shaped, double-walled depressions in longitudinal directions of the lattice rods such that at each intersection of the lattice rods four contact points are formed which are welded to one another, wherein the cavity-shaped depressions have elevated center portions which lie on top of one another at the intersections and which include the welded four contact points, and wherein lower sections of said depressions on each side of said elevated portions are lower than said elevated portions and form bending points of limited elasticity with a bending resistance moment which is reduced relative to said elevated portions to relieve said welds under static or dynamic loading of said outer jacket.

2. The pallet container according to claim 1, wherein said lattice rods have common tangential planes inside and outside said outer jacket.

3. The pallet container according to claim 1, wherein said lattice rods are welded by electrical resistance pressure welding.

4. The pallet container according to claim 1, wherein said lattice rods are welded by electrical spot welding.

* * * * *